Sept. 29, 1925.

M. L. HEINEKE

WEIGHING APPARATUS

Filed Oct. 26, 1921

Martin L. Heineke
INVENTOR.
BY
ATTORNEYS.

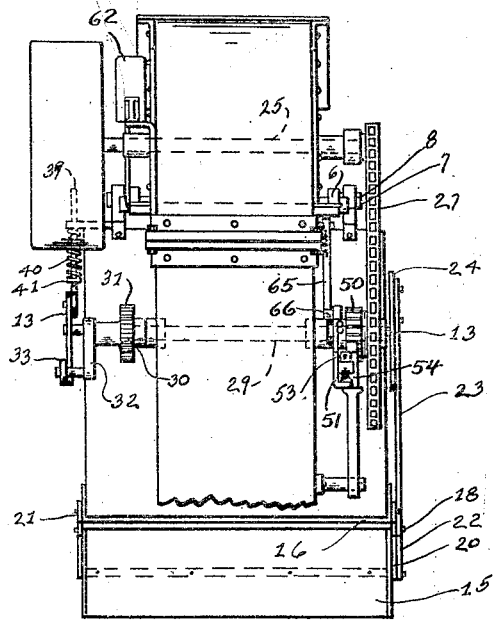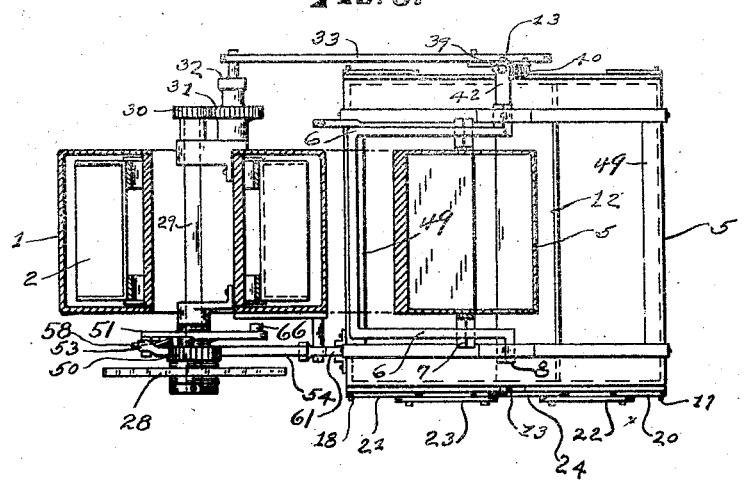

Sept. 29, 1925.

M. L. HEINEKE

WEIGHING APPARATUS

Filed Oct. 26, 1921

Martin L. Heineke
INVENTOR.
BY Erwin Wheeler & Woodard
ATTORNEYS.

Patented Sept. 29, 1925.

1,555,416

UNITED STATES PATENT OFFICE.

MARTIN L. HEINEKE, OF SPRINGFIELD, ILLINOIS.

WEIGHING APPARATUS.

Application filed October 26, 1921. Serial No. 510,536.

*To all whom it may concern:*

Be it known that I, MARTIN L. HEINEKE, a citizen of the United States, residing at Springfield, county of Sangamon, and State of Illinois, have invented new and useful Improvements in Weighing Apparatus, of which the following is a specification.

This invention relates to improvements in weighing apparatus, with especial reference to apparatus in which grain or similar material is to be weighed while in process of delivery from a chute or conveyor spout.

The object of this invention is to secure increased reliability and accuracy as compared with machines heretofore used for similar purposes.

Instead of attempting to utilize the relative weights of full and empty hoppers to operate the gates or valves of the weighing mechanism in accordance with the prevailing practice, this invention contemplates their operation from another source of mechanical power,—for example,—from the engine or motor which drives the threshing machine or elevator, in cases where the weighing apparatus is associated with such machinery.

The invention further contemplates utilizing the movement of a loaded hopper, or hopper compartment, to not only tilt the scale beam of the weighing apparatus, but also to control the application of power to the gates, whereby they may be positively adjusted to the desired position within a predetermined interval of time, and in a cycle of operations, which, in its final stages, resets the mechanism preparatory to a successive loading operation, and then automatically comes to rest pending such further loading operation.

In the drawings:

Figure 5 is a front elevation of the upper portion of the elevator, including the improved weighing mechanism.

Figure 6 is a sectional view drawn on line 6—6 on Figure 1.

Like parts are identified by the same reference characters thruout the several views.

Figure 1:
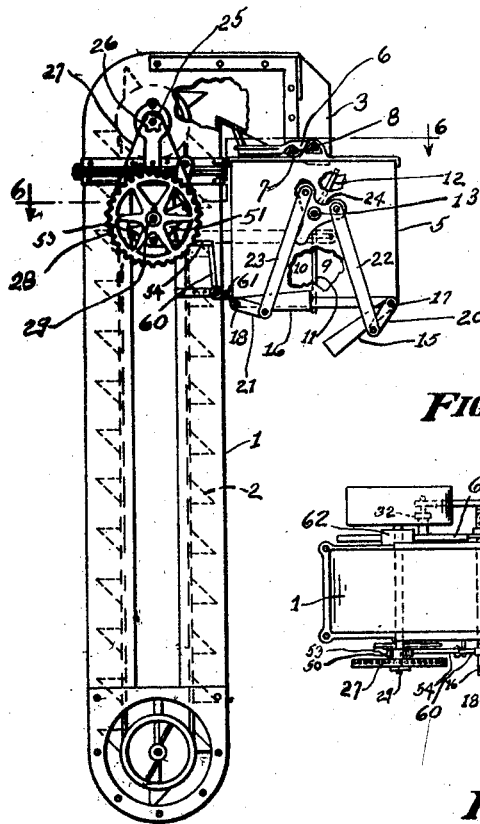
Figure 1 is a side elevation of a grain elevator with my improved weighing apparatus applied thereto, portions of the housing being broken away.

The housing 1 encloses ordinary grain elevating mechanism to a type commonly used to facilitate delivery of grain from a threshing machine or separator into sacks. The grain is lifted by the elevator buckets 2, which move with sufficient speed to throw the grain into the outlet portion 3 of the housing.

It will be observed that I have supported a hopper 5 from the portion 3 of the housing by scale beams 6 (one on each side) the latter being fulcrumed at 7 to the housing and the hopper being suspended from the short arm of the scale beam by bearing members 8.

The hopper is a duplex hopper, being subdivided into two compartments 9 and 10 by a vertical partition 11. A swinging gate 12 is pivotally mounted in the upper portion of the hopper, to swing from side to side on a pivot shaft 13 extending along the upper margin of the partition 11, whereby the grain may be deflected into either compartment. This gate or valve 12 may, for convenience in description, be termed the inlet gate of the hopper.

Figure 2:
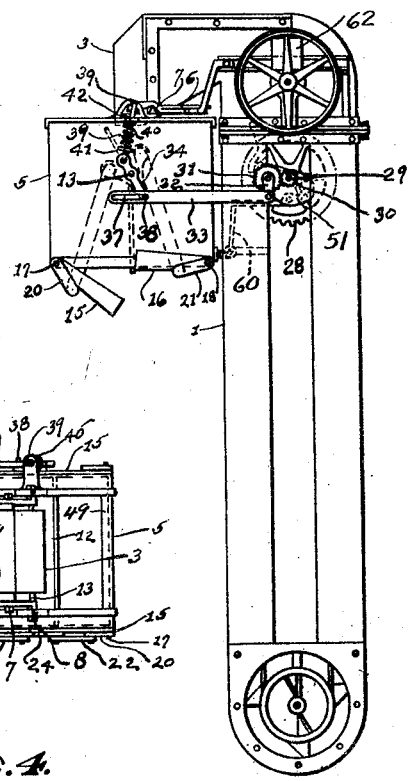
Figure 2 is an elevation of the same as viewed from the opposite or inner side.
Figure 3:
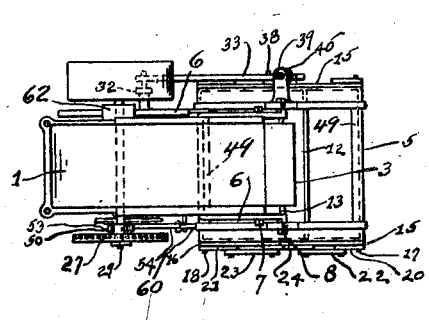
Figure 3 is a plan view.
Figure 4:
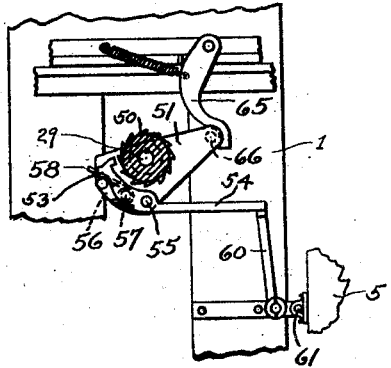
Figure 4 is an enlarged detailed view of the clutch and trip mechanism.

The compartments 9 and 10 are provided at their lower ends with outlet gates 15 and 16. These gates are pivoted to the front and rear hopper walls at 17 and 18 respectively, the arrangement being such that they swing upon axes parallel to the vertical plane occupied by the partition 11, and each gate is provided with exterior arms 20 and 21, connected by links 22 and 23 with an oscillatory plate or rocker member 24 secured to the pivot shaft 13. The links 22 and 23 are connected with the plate 24 on opposite sides of the pivot shaft 13, whereby, when one of the gates 15, (or 16), is swung downwardly to full open position, the other gate will be closed. Therefore, inasmuch as the gate 12 and the plate 24 are rigidly connected with the shaft 13, an oscillation of shaft 13, sufficient to reverse the position of the inlet gate 12 from that in which it is illustrated in Figure 2 to a corresponding inclination on the opposite side of the partition 11, will direct the flow of grain from hopper compartment 10 into compartment 9. The movement of plate 24 will simultaneously transmit motion thru the links 22 and 23 to close the gate 15 at the bottom of the compartment 9 and open gate 16 to allow compartment 10 to empty.

Power to oscillate shaft 13 as above described is derived from the shaft 25 of the elevator thru the pinion 26, chain 27, sprocket wheel 28, the clutch mechanism hereinafter described, shaft 29, gear wheels 30 and 31, crank 32, slotted link bar 33, and lever 34, the latter being fast on the pivot shaft 13. The slot 37 in the link rod 33 allows a limited free movement of lever 34, the latter having a projecting stud 38 loosely engaged in the slot 37. The upper end of the lever is pivotally connected with a swinging guide rod 39 having a compression spring 40 thereon seated between the collar 41 on the rod and the fixed abutment or seating 42 at the upper margin of the hopper 5. When the lever 34 swings toward a vertical position, the rod 39 slides thru the seating 42 and the spring 40 is compressed until the lever 34 passes the vertical line extending thru the pivotal axis of rod 13. The reaction of the spring then actuates lever 34 with a quick positive movement, which carries the stud 38 to the opposite end of slot 37 in link bar 33. This quick throw under spring pressure insures the adjustment of the gates to their extreme reversed position and the reversal is accomplished so quickly that no material quantity of grain will be permitted to escape thru the empty compartment. The inlet gate is also reversed so quickly that no material quantity of grain will be delivered into the filled compartment after the scale beam has been tilted by the weight of the grain in such compartment.

Each compartment is preferably provided with an overhanging ledge 49 along the upper margins of the hopper to catch rebounding grain and prevent it from scattering.

I have discovered that nearly all grain scattering from an open topped hopper on rebound, passes close to the wall margin on the opposite side from the point of entry and that the ledge 49, projecting inwardly but a short distance, will almost wholly prevent the grain from bounding out of the hopper.

The clutch mechanism.

The application of power to reverse the position of the gates is controlled by a suitable automatic clutch, normally retracted, but released for operation by the hopper 5 when the weight of the grain in one of the compartments is sufficient to tilt the scale beam 6. In the construction illustrated, the sprocket wheel 28 is normally loose on the shaft 29 and a ratchet wheel 50 is secured to the sprocket wheel and is therefore in constant rotation when the elevator is in operation.

A bracket 51 is secured to the shaft 29, and a clutch dog 53 is carried by a lever 54 pivoted to the bracket at 55, whereby the dog 53 may be utilized to couple the sprocket wheel and ratchet to the shaft 29. A spring 56, coiled about stud 57, has one end 58 loosely engaged with clutch dog 53 to urge it in the direction of ratchet 50, but the other end of the lever is utilized to hold the clutch dog out of such engagement when bearing upon the upper end of the bell crank trip 60. The short arm of the latter is pivoted to the hopper at 61 and when the hopper is loaded sufficiently to overcome the lifting effect of the weights 62 on the scale beams 6, the trip will be retracted from the lever 54 and the clutch dog will automatically engage the ratchet 50, thereby coupling sprocket wheel 28 to the shaft 29 as above stated. The latter will then perform one revolution, during the first half of which, the loaded hopper compartment will be emptied and the trip returned to a position in which it will be reengaged by lever 54 to retract the clutch dog 53 against the tension of spring 56. A spring pressed detent 65 simultaneously engages a stud 66 on the bracket 51 to positively stop the rotation of shaft 29 and prevent a relative backward rotation due to the reaction of spring 56.

It will be observed in Figure 2 that gear wheel 31 is twice the diameter of the gear wheel 30 on shaft 29. Therefore the single turn of shaft 29 will rotate gear wheel 31 and crank 32 a one half turn. During the first quarter of turn of the crank 32 the position of the gates will be reversed. The reaction of spring 40 in completing the reversal with a quick positive throw, leaves the lever 34 with an inclination reversed from that in which it is shown in Figure 2 and with the stud 38 at about the middle of the slot 37 when the crank 32 completes its first quarter turn. The second quarter turn of the crank retracts the link bar 33 sufficiently to engage the stud at the outer end of the slot where it will be effectively actuated when the crank commences the next half turn movement.

Figure 7:
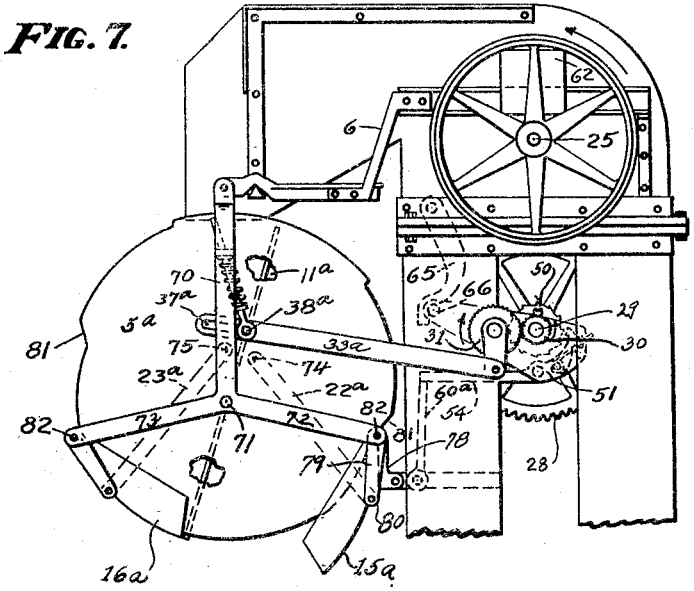
Figure 7 is a side elevation of a modified form of weighing mechanism embodying my invention in associated relation to the upper portion of the elevator.
Figure 8:
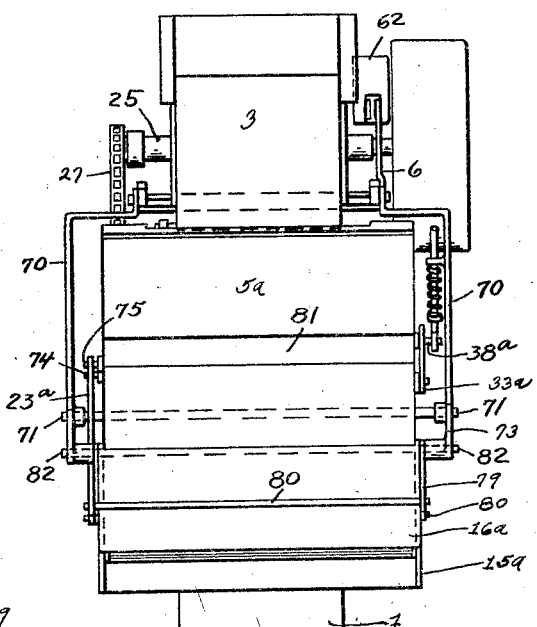
Figure 8 is a plan view of the same.
Figure 9:
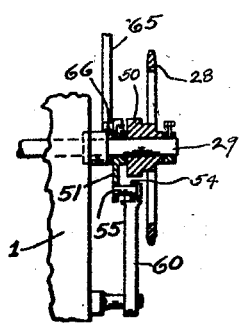
Figure 9 is a detail sectional view of one end of shaft 29 and the associated clutch member.

Referring to Figures 7 and 8 it will be observed that my invention is therein illustrated as applied to an oscillatory hopper 5ª, in which the upper portion of the partition 11ª serves also as an inlet gate to direct the grain into one compartment and then into the other when the hopper is oscillated.

The hopper is suspended from the scale beams by hangers 70 to which the hopper is pivoted at 71, preferably below its center. The outlet gates 15ª and 16ª are pivotally supported by the hanger arms 72 and 73 respectively and the gate operating links 22ª and 23ª are pivotally connected with one end of the hopper at 74 and 75 respectively. The slotted link bar 33ª operates directly upon the hopper to oscillate the latter, the hopper having a stud 38ª on its end wall, which engages in the link bar slot 37ª. A bracket 78, connected with one of the hanger arms 72, is utilized to operate the bell crank trip 60ª. The arms 79 and cross rods 80 are employed for reinforcement of the gates, the latter being formed of sheet metal. The hopper shown in Figures 7 and 8 is preferably of a generally cylindrical form, its walls being preferably notched at 81 to accommodate the cross rods 82 which connect the hanger arms 72 and 73. The eccentric position of the hopper makes this desirable and the notches may also allow the cross rods 82 to serve as stops to positively check the tilting movement of the hopper independently of the link bar 33ª. The operating mechanism, and all other parts not specifically described with reference to this modified form, may be assumed to be the same as those described with reference to Figures 1 to 6 inclusive.

I claim:

1. The combination with a hopper provided with inlet and outlet gates, means for supplying material to the hopper, and connections between said gates and material supplying means, of means controlled by the load in the hopper for causing the material supplying means to initiate movement of the hopper inlet and outlet gates, and supplemental means adapted to complete movement of said gates toward open or closed position by a quick positive action.

2. The combination with a hopper provided with inlet and outlet gates, means for supplying material to the hopper, and connections between said gates and material supplying means, of means controlled by the load in the hopper for causing the material supplying means to initiate movement of the inlet and outlet gates, and spring impelled means for completing movement of the gates toward open or closed position.

3. The combination with a hopper provided with inlet and outlet gates, means for supplying material to the hopper, and connections between said gates and material supplying means, of means controlled by the load in the hopper for causing the material supplying means to initiate movement of the inlet and outlet gates, and a spring adapted to have power stored therein during such initial movement of the gates and to effect completion of said movement toward open or closed position.

4. The combination with a hopper provided with inlet and outlet gates, means for supplying material to the hopper, and connections between said gates and material supplying means, of means controlled by the load in the hopper for causing the material supplying means to initiate movement of the inlet and outlet gates, and a spring arranged to be placed under compression during such initial movement of the gates and to effect completion of such movement toward open or closed position.

5. In a weighing mechanism of the described class, the combination with a hopper provided with outlet gates, a member adapted for constant rotation, a one turn member adapted for intermittent single rotations with intervening periods of dwell, a third member driven thereby in step by step half turn movements, connections between said third member and the gates for opening and closing the gates in alteration, and means controlled by the load in the hopper for connecting the constantly rotating member with the one turn member for a single rotation when the load equals a predetermined limit.

6. In a weighing mechanism, the combination with a hopper provided with gates allowing for alternate filling and discharging operations, of a gate operating member adapted to rotate step by step in half turn movements, operating connections between said member and the gates, adapted to initiate movement to open and close the hopper gates in alternation, and auxiliary means for imparting a quick free throw to said gates during their final opening or closing movement.

7. In a weighing mechanism the combination with a compartment hopper provided with gates allowing for alternate filling and discharging operations, of a reversible toggle mechanism for operating the gates, a spring adapted to resist alinements of the toggle members, and by its recoil to throw it out of alinement in either direction, said toggle including an operating lever, a rotary toggle actuating member means, controlled by the hopper load driving the member step by step in half turn movements, and a slotted link connecting the rotary member with the toggle and adapted to positively urge the toggle members across their position of alinement while allowing them to freely move in the same direction under the recoil of the spring after crossing said alinement.

8. In a weighing mechanism of the class described, the combination with a compartment hopper provided with outlet gates, a spring actuated reversible toggle mechanism for holding the gates alternately in open and closed positions, power driven crank mechanism for reversing the toggle mechanism to close one gate and open another, and load controlled means for causing the crank mechanism to operate step by step.

9. The combination of a weighing mechanism provided with a load receiving hopper, gates controlling the inlet and outlet of the hopper, a constantly rotating power wheel, a shaft connected to actuate both the inlet and outlet gates, a clutch, means controlled by the load in the hopper for causing the clutch to connect said shaft to the power wheel, and a spring cooperating with the shaft to supplement the power of the wheel.

10. The combination with a weighing mechanism provided with a load receiving hopper, of power driven means for feeding material to the hopper, gates for said hopper, clutch mechanism associated with said power driven means, clutch tripping mechanism adapted to be operated by said hopper, rotary mechanism driven through said clutch mechanism for actuating said gates to open and closed positions, said rotary means being adapted for half turn movements and to actuate said gates during a quarter turn thereof, and spring actuated toggle mechanism for completing the movement of said gates independently of said rotary means, whereby a period of dwell may be obtained during which the hopper may be emptied and the clutch tripping mechanism returned to its clutch disengaging position.

11. In a weighing mechanism having a hopper provided with plural compartments, each having an outlet gate, the combination with such gates of two rotary members operatively connected for rotation at different speeds, means for utilizing the weight of a loaded hopper compartment to effect a driving connection of the more rapidly rotating member with a source of power for a predetermined movement, and means for utilizing the more slowly rotating member to operate said gates alternately in opposite directions.

12. In a weighing mechanism having a hopper provided with plural compartments, each having an outlet gate, the combination with such gates, of two rotary members operatively connected for rotation at different speeds, means for utilizing the weight of a loaded hopper compartment to effect a driving connection of the more rapidly rotating member with a source of power for a predetermined movement, and means for utilizing the more slowly rotating member to operate said gates alternately in opposite directions, the parts being so related that one gate will be completely opened and the other gate completely closed prior to the completion of a movement of the more slowly rotating member, whereby the hopper is allowed to empty and return to a position for disconnecting the driving connections before the more rapidly moving rotary member has completed its predetermined movement.

MARTIN L. HEINEKE.